(12) United States Patent
Watanabe et al.

(10) Patent No.: US 10,195,887 B2
(45) Date of Patent: Feb. 5, 2019

(54) TRANSPARENT FILM, PRINTED MATTER, PRINTING DEVICE, AND PRINTING UNIT

(71) Applicant: Sharp Kabushiki Kaisha, Sakai, Osaka (JP)

(72) Inventors: Hisashi Watanabe, Sakai (JP); Akiko Miyazaki, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/310,138

(22) PCT Filed: Jun. 12, 2015

(86) PCT No.: PCT/JP2015/066959
§ 371 (c)(1),
(2) Date: Nov. 10, 2016

(87) PCT Pub. No.: WO2015/194462
PCT Pub. Date: Dec. 23, 2015

(65) Prior Publication Data
US 2017/0144467 A1 May 25, 2017

(30) Foreign Application Priority Data
Jun. 19, 2014 (JP) .................................. 2014-126392

(51) Int. Cl.
*B41M 5/00* (2006.01)
*B41M 5/50* (2006.01)
(Continued)

(52) U.S. Cl.
CPC ............ *B41M 5/504* (2013.01); *B32B 27/00* (2013.01); *B41J 2/01* (2013.01); *B41M 5/0047* (2013.01);
(Continued)

(58) Field of Classification Search
CPC .... B41M 2/01; B41M 5/0047; B41M 5/0064; B41M 5/508; B41M 5/5218
See application file for complete search history.

(56) References Cited

U.S. PATENT DOCUMENTS 3,833,368 A * 9/1974 Land ................... G03C 8/52
359/582
5,461,660 A * 10/1995 Dooms .................. G03C 5/17
250/487.1
(Continued)

FOREIGN PATENT DOCUMENTS

| JP | H09-167051 A | 6/1997 |
|----|--------------|--------|
| JP | H09-175005 A | 7/1997 |

(Continued)

OTHER PUBLICATIONS

International Search Report PCT/ISA/210 for International Application No. PCT/JP2015/066959 dated Aug. 11, 2015.

*Primary Examiner* — Betelhem Shewareged
(74) *Attorney, Agent, or Firm* — Harness, Dickey & Pierce, P.L.C.

(57) ABSTRACT

A transparent film is provided, enabling a printed matter that is less likely to exhibit apparently white-tinged images and has less degraded image quality. The transparent film of an embodiment of the present application includes a support; an anti-reflection layer disposed on one side of the support; and an ink-absorbing layer disposed on the other side of the support. The anti-reflection layer preferably has, on the surface thereof on the side opposite to the support, an anti-reflection structure with multiple protrusions disposed at a pitch not greater than the visible light wavelength.

19 Claims, 5 Drawing Sheets

(51) Int. Cl.
- B32B 27/00 (2006.01)
- B41J 2/01 (2006.01)
- B41M 5/52 (2006.01)
- B32B 33/00 (2006.01)
- B32B 37/00 (2006.01)
- B32B 38/00 (2006.01)

(52) U.S. Cl.
CPC .......... *B41M 5/0064* (2013.01); *B41M 5/508* (2013.01); *B41M 5/5218* (2013.01); *B32B 33/00* (2013.01); *B32B 37/003* (2013.01); *B32B 38/0004* (2013.01); *B32B 38/145* (2013.01); *B32B 2307/412* (2013.01); *B41M 2205/34* (2013.01); *B41M 2205/36* (2013.01); *B41M 2205/40* (2013.01)

(56) References Cited

U.S. PATENT DOCUMENTS

| | | | |
|---|---|---|---|
| 6,605,337 | B1 | 8/2003 | Mori et al. |
| 2004/0012663 | A1* | 1/2004 | Takashima ............... B41M 5/52 347/100 |
| 2006/0158481 | A1* | 7/2006 | Spevak ................. B41J 2/2114 347/43 |
| 2007/0059476 | A1* | 3/2007 | Dronzek, Jr. ......... B44C 1/1733 428/40.1 |
| 2010/0134733 | A1 | 6/2010 | Watanabe et al. |
| 2012/0008213 | A1 | 1/2012 | Tsuda et al. |
| 2012/0212825 | A1* | 8/2012 | Nomura ................. G02B 1/118 359/580 |
| 2014/0063607 | A1 | 3/2014 | Fukuda et al. |

FOREIGN PATENT DOCUMENTS

| | | | |
|---|---|---|---|
| JP | H11-77874 | A | 3/1999 |
| JP | H11-110129 | A | 4/1999 |
| JP | 2000-313083 | A | 11/2000 |
| JP | 2002-241714 | A | 8/2002 |
| JP | 2003-011497 | A | 1/2003 |
| JP | 2003-280167 | A | 10/2003 |
| JP | 4170688 | B2 | 10/2008 |
| JP | 2010-052207 | A | 3/2010 |
| JP | 2010-098073 | A | 4/2010 |
| JP | 2011-110817 | A | 6/2011 |
| JP | 2012-163723 | A | 8/2012 |
| JP | 2013177526 | A * | 9/2013 ............. C09D 11/00 |
| WO | WO-2009-019839 | A1 | 2/2009 |
| WO | WO-2010-113868 | A1 | 10/2010 |
| WO | WO-2012-133943 | | 4/2012 |

* cited by examiner (a)

(b)

(c)

(d)

(e)

(f)

(a)

(b)

(c)

(d)

(e)

(f)

TRANSPARENT FILM, PRINTED MATTER, PRINTING DEVICE, AND PRINTING UNIT

TECHNICAL FIELD

The present invention relates to transparent films, printed matters, printing devices, and printing units. More specifically, the present invention relates to a transparent film suitably used for printing of data such as an image thereon, a printed matter including the transparent film on which data is printed, a printing device configured to print data on the transparent film, and a printing unit utilizing the transparent film and the printing device.

BACKGROUND ART

Black colors of film photos among printed matters look deeper so that the image quality thereof is high, but the incident light reflects on the surfaces thereof in bright places so that the visibility thereof may decrease. Thus, Patent Literatures 1 to 3, for example, each propose a laminated printed matter including such a printed matter and an anti-reflection layer disposed on the viewing side surface of the printed matter. Examples of known anti-reflection layers include resin films and inorganic films with a monolayer or multilayer structure of materials having different refractive indexes, as well as a moth-eye structure which is one of nanometer-scale rough structures (nanostructures) (for example, see Patent Literatures 4 to 6). The moth-eye structure may have a large number of nanometer-scale, substantially conical protrusions on the surface of a support. Such a moth-eye structure provides a continuously varying refractive index from the air layer to the support, significantly reducing reflected light. For good productivity, the anti-reflection layer is usually formed on a transparent support (hereinafter, the resulting workpiece is also referred to as an anti-reflection film), and then is closely attached to the viewing side surface of a printed matter in many cases.

CITATION LIST

Patent Literature

Patent Literature 1: JP 4170688 B
Patent Literature 2: JP 2003-280167 A
Patent Literature 3: JP H11-77874 A
Patent Literature 4: JP 2012-163723 A
Patent Literature 5: WO 2010/113868
Patent Literature 6: WO 2009/019839

SUMMARY OF INVENTION

Technical Problem

However, conventional laminated printed matters including an anti-reflection film attached to the viewing side surface of a printed matter may suffer entry of air bubbles between the printed matter and the anti-reflection film and peeling of an edge (outer edge) of the anti-reflection film from the printed matter. As a result, the portion where the anti-reflection film is separated (peeled) gives an apparently white-tinged image, impairing the image quality of the printed matter. The inventors have studied the causes thereof to find the following facts.

FIG. 6 is a schematic cross-sectional view illustrating a conventional laminated printed matter. The following will describe the case where an anti-reflection film is peeled from a printed matter at an edge (outer edge) of the laminated printed matter, with air bubbles entered between the printed matter and the anti-reflection film. As illustrated in FIG. 6, a laminated printed matter 119 includes, from the back side to the viewing side, a printed matter 101 and an anti-reflection film 103. The anti-reflection film 103 includes, from the back side to the viewing side, a support 104 and an anti-reflection layer 105, and is attached to the viewing side surface of the printed matter 101 with an adhesive layer 109 in between.

As illustrated in FIG. 6, an air bubble 120 is present between the printed matter 101 and the anti-reflection film 103 (adhesive layer 109) in a region AR101, and the anti-reflection film 103 is peeled from the printed matter 101 in a region AR102. This is found to be caused by, for example, deformation, creases, air bubbles sandwiched, or poor formation of the adhesive layer 109 during attachment of the anti-reflection film 103 to the printed matter 101, damages due to cutting during formation of the edge surface of the laminated printed matter 119, and degradation over time. In a region AR103 (region other than the regions AR101 and AR102), the anti-reflection film 103 is attached to the printed matter 101. The anti-reflection layer 105 is tightly attached to the support 104, and thus the anti-reflection layer 105 itself is rarely peeled off.

The region AR103 has a reflectance that is substantially equal to the ratio (visible light reflectance) of the reflected light to the visible light incident on the interface between the anti-reflection layer 105 and an air layer 118a, and is about 0.5% or lower. The region AR101 has a reflectance that is substantially equal to the sum of the visible light reflectance at the interface between the adhesive layer 109 and the air bubble 120 (about 4%) and the visible light reflectance at the interface between the air bubble 120 and the printed matter 101 (about 4%), and is about 8% (the visible light reflectance at the interface between the anti-reflection layer 105 and the air layer 118a, which is a relatively low value (about 0.5% or lower), is excluded). The region AR102 has a reflectance that is substantially equal to the sum of the visible light reflectance at the interface between the adhesive layer 109 and an air layer 118b (about 4%) and the visible light reflectance at the interface between the air layer 118b and the printed matter 101 (about 4%), and is about 8% (the visible light reflectance at the interface between the anti-reflection layer 105 and the air layer 118a, which is a relatively low value (about 0.5% or lower), is excluded). The inventors found that a great difference in reflectance between the regions AR101 and AR102 and the region AR103 causes an apparently white-tinged image in the regions AR101 and AR102.

In order to solve such a problem of an apparently white-tinged image, the inventors have studied a method of forming an anti-reflection layer directly on a printed matter (this process is also referred to as film formation). If the anti-reflection layer is an inorganic film, however, the printed matter is damaged due to heat or plasma generated during the film formation. If the anti-reflection layer is a resin film (organic film), the printed matter is damaged due to, for example, a solvent contained in the resin. Thus, the inventors have found it difficult to form an anti-reflection layer directly while maintaining the image quality of the printed matter.

As mentioned above, no means has been found for solving the problem of an apparently white-tinged image in a laminated printed matter including a printed matter and an anti-reflection film attached to the printed matter. For example, the above Patent Literatures 1 to 3 include no description focusing on such apparently white-tinged images, and thus teach no means for solving the apparently white-tinged images. The same applies to the above Patent Literatures 4 to 6.

The present invention has been made in view of the above current state of the art, and aims to provide a transparent film enabling a printed matter that is less likely to exhibit apparently white-tinged images and has less degraded image quality, a printed matter including the transparent film on which data is printed, a printing device configured to print data on the transparent film, and a printing unit utilizing the transparent film and the printing device.

Solution to Problem

The inventors have made various studies on transparent films enabling a printed matter that is less likely to exhibit apparently white-tinged images and has less degraded image quality. As a result, the inventors have focused on a configuration in which the printing portion (portion on which data is to be printed) and the anti-reflection film are integrated without being attached to each other with a component such as an adhesive layer in between. The inventors have then found a configuration in which an ink-absorbing layer on which data such as an image is to be printed is disposed on the support of the anti-reflection film on the surface on the side opposite to the anti-reflection layer side surface. This configuration was found to be able to prevent separation of the printing portion and the anti-reflection film due to factors such as air bubbles or peeling, thereby being less likely to cause apparently white-tinged images. Also, this configuration allows formation of the anti-reflection layer before printing of data such as an image, and thus gives less degraded image quality to the printed matter. Thereby, the inventors have solved the above problems, completing the present invention.

One aspect of the present invention may be a transparent film including: a support; an anti-reflection layer disposed on one side of the support; and an ink-absorbing layer disposed on the other side of the support.

Another aspect of the present invention may be a printed matter including the transparent film whose ink-absorbing layer side has been subjected to printing.

Yet another aspect of the present invention may be a printing device configured to perform printing on the transparent film, the printing device producing a reversed image of input image information, and printing the reversed image on the ink-absorbing layer side of the transparent film.

Yet another aspect of the present invention may be a printing unit including the transparent film, and a printing device configured to perform printing on the transparent film, the printing device producing a reversed image of input image information, and printing the reversed image on the ink-absorbing layer side of the transparent film.

Advantageous Effects of Invention

The present invention can provide a transparent film enabling a printed matter that is less likely to exhibit apparently white-tinged images and has less degraded image quality, a printed matter including the transparent film on which data is printed, a printing device configured to print data on the transparent film, and a printing unit utilizing the transparent film and the printing device.

DESCRIPTION OF EMBODIMENTS

Figure 1:
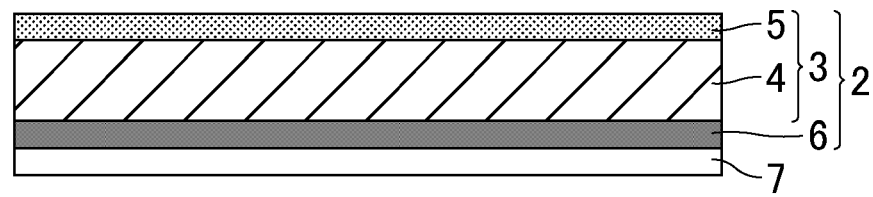
FIG. 1 is a schematic cross-sectional view illustrating a printed matter of Embodiment 1.

The present invention will be mentioned in more detail referring to the drawings in the following embodiments, but is not, limited to these embodiments. The configurations of the respective embodiments may be appropriately combined or modified as long as the combination or modification is not beyond the spirit of the present invention.

The term "transparent" herein means that the light transmittance is 80% or higher and preferably means a colorless, transparent state. The term "anti-reflection" means the state where, as a result of forming a layer on the support, the support has lower reflectance at the interface with the layer than with the air layer. The term "reflectance" herein means the visible light reflectance relative to the incident visible light, unless otherwise mentioned.

Embodiment 1

Embodiment 1 relates to a printed matter provided with a transparent film that includes an ink-absorbing layer and an anti-reflection film including a support and an anti-reflection layer. On the transparent film, data is printed. The printed matter includes a light-reflective member (ink layer) on the surface of the ink-absorbing layer on the side opposite to the support.

(1) Structure of Printed Matter

FIG. 1 is a schematic cross-sectional view illustrating a printed matter of Embodiment 1. As illustrated in FIG. 1, a printed matter 1a includes a white-ink layer 7, which serves as a light-reflective member, and a transparent film 2 in the given order from the back side to the viewing side. The transparent film 2 includes an ink-absorbing layer 6 and an anti-reflection film 3 in the given order from the back side to the viewing side. The anti-reflection film 3 includes a support 4 and an anti-reflection layer 5 in the given order from the back side to the viewing side. The term "viewing side" herein means, for example in FIG. 1, the upper side of the printed matter 1a. The term "back side" means, in FIG. 1, the lower side of the printed matter 1a. The same shall apply to the other embodiments.

The anti-reflection layer 5 can be one having a moth-eye structure, for example. The pitch between protrusions (the distance between the vertices of adjacent protrusions) constituting the moth-eye structure may be any value not greater than the visible light wavelength (780 nm), and is preferably not smaller than 100 nm and not greater than 700 nm. Each protrusion may have any height, and the height is preferably not lower than 100 nm and not higher than 400 nm. Each protrusion may have any shape, such as a substantially conical shape. In order to form such protrusions, the protrusions are preferably formed from resin. The method of forming the anti-reflection layer 5 having a moth-eye structure on the surface of the support 4 may be a method of transferring a transparent resin on the surface of the support 4 using a mold on which small protrusions are formed, such as a method disclosed in the above Patent Literature 6. The method disclosed in the above Patent Literature 6 forms macro protrusions and micro protrusions as the moth-eye structure. In the present embodiment, macro protrusions and micro protrusions may be formed, or micro protrusions alone may be formed.

The anti-reflection layer 5 may also be formed from a film without a moth-eye structure, such as a resin film or an inorganic film, for example. If the anti-reflection layer 5 is formed from a resin film, the anti-reflection film 3 may be an anti-reflection film available from Panasonic Corp. (trade name: Fine Tiara), for example. Alternatively, the anti-reflection layer 5 formed from a resin film may have a structure in which a low refractive index resin and a high refractive index resin are stacked from the back side to the viewing side. If necessary, a large number of such layers may be stacked alternately. As the number of layers stacked increases, the reflectance decreases, and thus the anti-reflection performance is improved. In contrast, the cost increases. The low refractive index resin may be one prepared by thinly applying a fluorine-based resin, such as a low refractive index material available from JSR Corp. (trade name: OPSTAR®), for example. The high refractive index resin may be one prepared by thinly applying a high refractive index coating liquid available from Sumitomo Osaka Cement Co., Ltd., for example.

If the anti-reflection layer 5 is formed from an inorganic film, the anti-reflection film 3 may be an anti-reflection film available from Dexerials Corp., for example. In this case, the anti-reflection layer 5 may usually have a structure in which silicon dioxide ($SiO_2$), which constitutes a low refractive index film, and niobium pentoxide ($Nb_2O_5$), which constitutes a high refractive index film, are alternately stacked.

The support 4 may be a transparent material, and may be a polyethylene terephthalate (PET) film, for example. The support 4 may have any thickness such as 100 μm, for example.

The ink-absorbing layer 6 is a layer on which data such as an image is printed. The ink-absorbing layer 6 can be formed by, for example, dispersing a pigment having a large surface area (e.g. porous silica) in a binder, and applying the pigment-dispersed binder to the target surface. The ink-absorbing layer 6 can fix ink thereon. The ink-absorbing layer 6 may have any thickness, and the thickness is preferably not smaller than 5 μm and not greater than 50 μm, more preferably not smaller than 10 μm and not greater than 40 μm. If the thickness of the ink-absorbing layer 6 is too small, the ink may not be easily fixed. If the thickness of the ink-absorbing layer 6 is too large, the layer 6 may exhibit reduced transparency.

The ink used for printing of data on the ink-absorbing layer 6 may be either a pigment ink or a dye ink. Data may be printed on the ink-absorbing layer 6 by any printing method, such as offset printing, gravure printing, screen printing, inkjet printing, laser printing, or silver halide printing. The printing device employing the inkjet printing can be, for example, a general-purpose inkjet color printer available from Seiko Epson Corporation. The print portion on the ink-absorbing layer 6 in the printed matter 1a is observed from the viewing side (anti-reflection layer 5 side). Due to this design, some shapes of images to be printed may require the images to be horizontally reversed before the images are printed on the ink-absorbing layer 6 side surface. In this case, image information with a reversed image may be input to the printing device and the reversed image may be printed on the ink-absorbing layer 6 side surface of the transparent film 2. Alternatively, the image information input to the printing device may be reversed, and the resulting reversed image may be printed on the ink-absorbing layer 6 side surface of the transparent film 2. For efficiency of printing, the latter method is preferred.

The white-ink layer 7 is used to prevent the back side of the printed matter 1a from being visible therethrough and to provide the image printed on the ink-absorbing layer 6 vividly by utilizing its light reflection. The white-ink layer 7 is formed on the entire surface of the ink-absorbing layer 6 on the side opposite to the support 4. The white-ink layer 7 can be produced using a general-purpose ink, such as highly reflective white ink available from Teikoku Printing Inks Mfg. Co., Ltd. The white-ink layer may be formed by any method, such as offset printing, gravure printing, screen printing, inkjet printing, laser printing, or silver halide printing. The white-ink layer 7 may have any thickness, and the thickness is preferably not smaller than 5 μm and not greater than 100 μm. If the thickness of the white-ink layer 7 is smaller than 5 μm, the white-ink layer 7 may have insufficient light reflectivity. If the thickness of the white-ink layer 7 is greater than 100 μm, the white-ink layer 7 may have insufficient flexibility to suffer problems such as cracking or peeling from the transparent film 2 upon bending. Also, if the white-ink layer 7 alone unfortunately allows the back side of the printed matter 1a to be visible therethrough, it is preferred to further dispose a black-ink layer serving as a light-shielding member on the white-ink layer 7 on the side opposite to the transparent film 2 so as to further enhance the light-shielding performance. The black-ink layer can be produced using a general-purpose ink, such as black ink available from Teikoku Printing Inks Mfg. Co., Ltd. The light-reflective member (ink layer) preferably has a light reflectance of 70% or higher, more preferably 80% or higher. The light-shielding member (ink layer) preferably has a light transmittance of 10% or lower, more preferably 5% or lower. Any light-reflective member and light-shielding member that can achieve the desired functions may be used and the members may each be an ink layer having any color other than white and black, regardless of the number of ink layers stacked and the stacking order. In order to reflect the intended color and brightness of the ink used for printing of data on the ink-absorbing layer 6, the light-reflective member (ink layer) is preferably white.

Since the configuration in Embodiment 1 includes the ink-absorbing layer 6 and the anti-reflection film 3 integrated, the ink-absorbing layer 6 and the anti-reflection film 3 can be prevented from being separated from each other due to factors such as air bubbles and peeling. Thereby, the configuration enables a printed matter that does not exhibit apparently white-tinged images and has image quality perfectly prevented from degrading. The configuration of Embodiment 1 is also applicable to both a printed matter with a frame and a printed matter without a frame.

(2) Process of Producing Printed Matter

Figure 2:
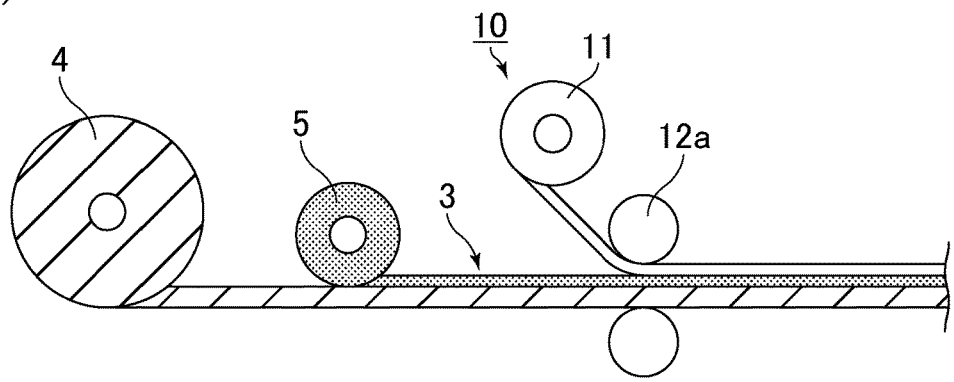
FIG. 2 includes schematic cross-sectional views illustrating the process of producing the printed matter of Embodiment 1 (steps a to f).
Figure 2:
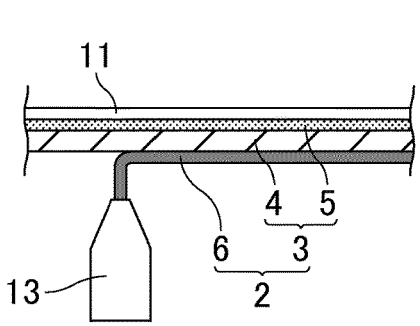
Figure 2:
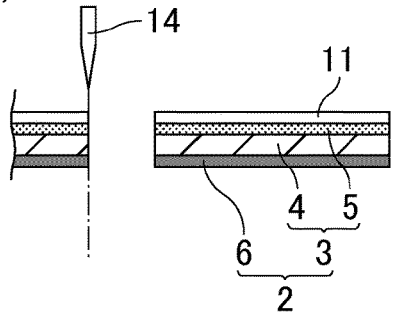
Figure 2:
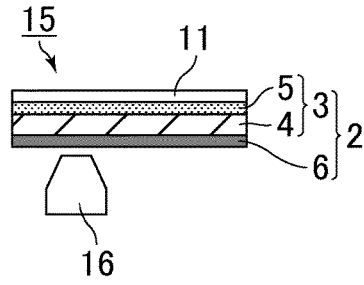
Figure 2:
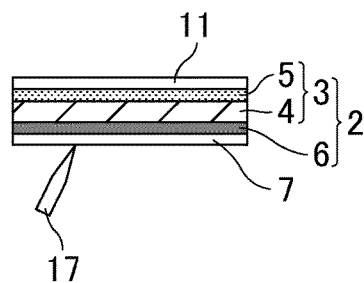
Figure 2:
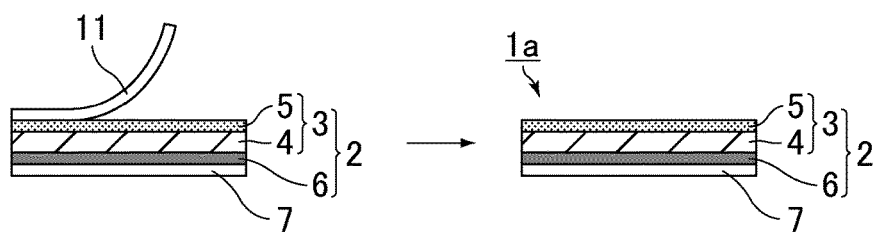

FIG. 2 includes schematic cross-sectional views illustrating the process of producing the printed matter of Embodiment 1 (steps a to f). The following describes the case where the anti-reflection layer 5 has a moth-eye structure, but the anti-reflection layer 5 may have any other configuration (e.g. resin film, inorganic film).

a) Formation of Anti-Reflection Film

As illustrated in the view (a) of FIG. 2, first, a rolled-up support 4 (e.g. a 100-μm-thick PET film) is prepared. On the surface of the support 4 is stacked a transparent resin (anti-reflection layer 5) having a moth-eye structure using a roll-shaped mold, so that the anti-reflection film 3 is completed. A rolled-up protective film 11 with a slightly adhesive layer is prepared. The protective film 11 is press-attached to the anti-reflection layer 5 side surface of the anti-reflection film 3 using a roller 12a of a laminating device 10. The protective film 11 is disposed to protect the anti-reflection layer 5. The laminating device 10 may be a usual device, and may be a laminating device available from Fujipream Corp., for example. The method for attaching the protective film 11 to the anti-reflection film 3 described above is press-attaching rolled-up sheets to each other. Alternatively, an anti-reflection film 3 and a protective film 11 each having a predetermined shape may be attached to each other by, for example, a sheet-to-sheet attaching device available from Climb Products Co., Ltd.

(b) Formation of Transparent Film

As illustrated in the view (b) of FIG. 2, an ink-absorbing layer 6 (e.g. 10-μm-thick layer) is applied to the support 4 side surface of the anti-reflection film 3 using a slot coater 13, whereby a rolled-up transparent film 2 is formed.

(c) Cutting

As illustrated in the view (c) of FIG. 2, the transparent film 2 with the protective film 11 is cut into a predetermined size (e.g. A4 size) using a cutting unit 14. The cutting unit 14 may be a usual cutting system. For example, in the case of a die-cutting system, a Thomson die may be used.

(d) Printing

As illustrated in the view (d) of FIG. 2, an image is printed on the ink-absorbing layer 6 side of the transparent film 2 using a printing device 16 (e.g. inkjet printer) included in a printing unit 15. Some shapes of images to be printed may require the images to be horizontally reversed before the images are printed on the ink-absorbing layer 6 side surface. In this case, image information with a reversed image may be input to the printing device 16 and the reversed image may be printed on the ink-absorbing layer 6 side surface of the transparent film 2. Alternatively, the image information input to the printing device 16 may be reversed, and the resulting reversed image may be printed on the ink-absorbing layer 6 side surface of the transparent film 2. Here, the printing unit 15 includes the transparent film 2 and the printing device 16.

(e) Formation of Light-Reflective Member (Ink Layer)

As illustrated in the view (e) of FIG. 2, after the printing surface of the ink-absorbing layer 6 is sufficiently dried, the white-ink layer 7 is formed on the entire surface of the ink-absorbing layer 6 on the side opposite to the support 4 using a screen printer 17.

(f) Completion of Printed Matter

As illustrated in the view (f) of FIG. 2, after the white-ink layer 7 is sufficiently dried, the protective film 11 is peeled from the transparent film 2, so that the printed matter 1a is completed.

The process of producing a printed matter described above is merely one example, and any other process capable of producing a printed matter having the same final structure as that of Embodiment 1 may be employed. For example, in the case that a photo-printing company prints data, a higher production efficiency may be achieved and the cost may be reduced by employing a process of forming the rolled-up transparent film 2 (step (b)), performing printing (step (d)), forming the white-ink layer 7 (step (e)), and cutting the workpiece into a predetermined size (step (c)). The protective film 11 may be unnecessary in some cases. In the case that an individual prints data using a consumer color printer and the provided transparent film 2, the anti-reflection layer 5 may possibly be contaminated during process. Hence, the protective film 11 for protection of the anti-reflection layer 5 is preferably attached to the transparent film 2, and the protective film 11 may be peeled at a later timing such as after printing.

The following describes examples in which the printed matter of Embodiment 1 was actually produced.

Example 1

Example 1 is the case where the anti-reflection layer 5 has a moth-eye structure.

The anti-reflection film 3 used had the following configuration.

(A) Pitch between protrusions: 200 nm
(B) Height of protrusions: 200 nm
(C) Shape of protrusions: Substantially conical shape
(D) Support 4: 100-μm-thick PET film The ink-absorbing layer 6 had a thickness of 10 μm. The printing device 16 used was an inkjet color printer (e.g. trade name: EP-976A3) available from Seiko Epson Corporation. With the printer, data was printed on the ink-absorbing layer 6 side of the transparent film 2 that was cut into the A4 size. Here, image information with a reversed image was input to the printing device 16 and the reversed image was printed.

The white-ink layer 7 was produced using highly reflective white ink available from Teikoku Printing Inks Mfg. Co., Ltd., and had a thickness of 20 μm.

Example 2

Example 2 is the case where the anti-reflection layer 5 is formed from a resin film. Since the printed matter of Example 2 is the same as that of Example 1 except for this configuration, the same points are not described here.

The anti-reflection film 3 used was an anti-reflection film (trade name: Fine Tiara) available from Panasonic Corporation.

Example 3

Example 3 is the case where the anti-reflection layer 5 is formed from an inorganic film. Since the printed matter of Example 3 is the same as that of Example 1 except for this configuration, the same points are not described here.

The anti-reflection film 3 used was an anti-reflection film available from Dexerials Corporation.

(Evaluation Results)

The reflectance was measured using each of the printed matters of Examples 1 to 3. Table 1 shows the measurement results. The reflectance was measured using a spectrophotometer (trade name: CM2002) available from Minolta Co., Ltd., with a black image printed entirely on the ink-absorbing layer 6 side surface of the transparent film 2. Also, the same configuration as that of Example 1 but without the anti-reflection layer 5 was evaluated (Comparative Example 1).

TABLE 1

|  | Anti-reflection layer configuration | Reflectance (%) |
| --- | --- | --- |
| Example 1 | Moth-eye structure | 0.10 |
| Example 2 | Resin film | 0.50 |
| Example 3 | Inorganic film | 0.26 |

TABLE 1-continued

| | Anti-reflection layer configuration | Reflectance (%) |
|---|---|---|
| Comparative Example 1 | N/A | 4.0 |

As shown in Table 1, the printed matters of Examples 1 to 3 each demonstrated a lower reflectance than the printed matter of Comparative Example 1. In particular, the printed matter of Example 1 demonstrated a significantly lower reflectance than any other printed matters of the examples. Hence, the printed matter of Example 1 with such a low reflectivity can present a jet-black color. Also, a conventional printed matter (e.g. photograph) alone unfortunately reflects light components having a wavelength corresponding to a color other than red on the surface thereof in a region in which an image is printed with a red ink, which reduces the color purity. In contrast, the printed matter of Example 1 has a significantly small surface reflectance of every light component in the entire visible light region, and thus can display the true color of the ink without color purity reduction. Thus, the printed matter of Example 1 can exhibit even higher image quality than the printed matters of the other examples. The printed matter of Example 3 had a second best reflectance of 0.26% next to the printed matter of Example 1, but had a problem of tinted reflected light due to its wavelength-dependent reflectance. This problem causes visual recognition of a tint undesired by the creator particularly in a photograph used for an artwork, and thus has been strongly desired to be eliminated. The printed matter of Example 1 did not involve the problem of tinted reflected light. The printed matter of Example 2 did not produce much tinted reflected light, and had a third best reflectance of 0.50% next to the printed matters of Examples 1 and 3. Also, the printed matters of Examples 1 to 3 did not exhibit visually recognizable apparently white-tinged images at all, and beautifully displayed the images.

Embodiment 2

Embodiment 2 relates to a printed matter provided with a transparent film that includes an ink-absorbing layer and an anti-reflection film including a support and an anti-reflection layer. On the transparent film, data is printed. The difference from Embodiment 1 is use of a film as the light-reflective member in place of the ink layer. Since the printed matter of Embodiment 2 is the same as that of Embodiment 1 except for this configuration, the same points are not described here.

(1) Structure of Printed Matter

Figure 3:
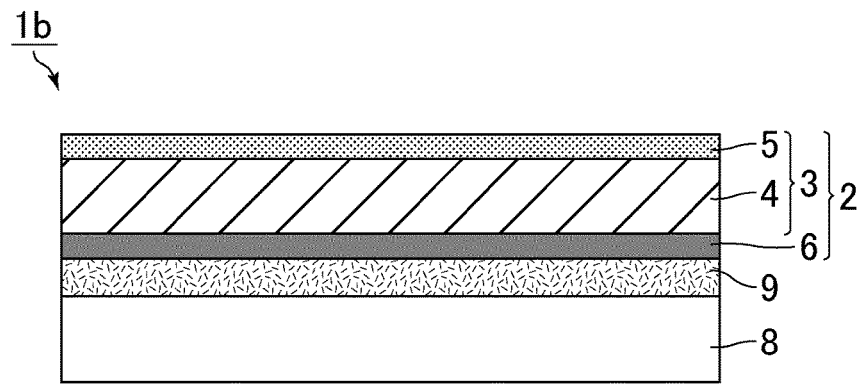
FIG. 3 is a schematic cross-sectional view illustrating a printed matter of Embodiment 2.

FIG. 3 is a schematic cross-sectional view illustrating a printed matter of Embodiment 2. As illustrated in FIG. 3, a printed matter 1b includes a white film 8, which serves as the light-reflective member, and the transparent film 2 in the given order from the back side to the viewing side. The transparent film 2 includes the ink-absorbing layer 6 and the anti-reflection film 3 in the given order from the back side to the viewing side, and is attached to the white film 8 with an adhesive layer 9 in between. The anti-reflection film 3 includes the support 4 and the anti-reflection layer 5 in the given order from the back side to the viewing side.

The white film 8 is used to prevent the back side of the printed matter 1b from being visible therethrough and to provide the image printed on the ink-absorbing layer 6 vividly by utilizing its light reflection. The white film 8 is attached, with the adhesive layer 9 in between, to the entire surface of the ink-absorbing layer 6 on the side opposite to the support 4. The white film 8 used can be a general-purpose white film, such as a white PET film available from Teijin DuPont Films Japan Limited. The white film 8 may have any thickness, and the thickness is preferably not smaller than 10 μm and not greater than 100 μm. If the thickness of the white film 8 is smaller than 10 μm, the white film 8 may have insufficient light reflectivity. If the thickness of the white film 8 is greater than 100 μm, the white film 8 may have insufficient flexibility to suffer problems such as peeling from the transparent film 2 upon bending. The white film 8 is not necessarily attached to the surface of the ink-absorbing layer 6 opposite to the support 4, and may simply be stacked on the ink-absorbing layer 6 without the adhesive layer 9 in between. That is, the printed matter 1b may have a configuration of including the white film 8, the ink-absorbing layer 6, the support 4, and the anti-reflection layer 5 in the given order from the back side to the viewing side. There is a concern that this configuration may allow contaminants such as dust to enter between the ink-absorbing layer 6 and the white film 8 and then to scratch or contaminate the printing surface. It is therefore preferred to minimize this concern by, for example, putting the printed matter in a frame. Also, if the white film 8 alone unfortunately allows the back side of the printed matter 1b to be visible therethrough, it is preferred to further dispose a black film serving as a light-shielding member on the white film 8 on the side opposite to the transparent film 2 so as to further enhance the light-shielding performance. The black film can be a general-purpose black film, such as a black PET film available from Teijin DuPont Films Japan Limited. The light-reflective member (film) preferably has a light reflectance of 70% or higher, more preferably 80% or higher. The light-shielding member (film) preferably has a light transmittance of 10% or lower, more preferably 5% or lower. Any light-reflective member and light-shielding member that can achieve the desired functions may be used and the members may each be a film having any color other than white and black, regardless of the number of stacked films and the stacking order thereof. In order to reflect the intended color and brightness of the ink used for printing of data on the ink-absorbing layer 6, the light-reflective member (film) is preferably white.

The white film 8 and the support 4 are preferably made of the same material. If the white film 8 and the support 4 are made of different materials, the white film 8 and the support 4 may have greatly different coefficients of thermal expansion. There is a concern that this difference may cause a warp of the printed matter 1b with changes in temperature. A preferred combination of the material of the white film 8 and the material of the support 4 is a combination of PET films, for example. The white film 8 and the support 4 are preferably made of exactly the same material, but may be made of materials with different compositions (e.g. component contents) as long as the white film 8 and the support 4 have coefficients of thermal expansion of the same level. The expression "the white film 8 and the support 4 have coefficients of thermal expansion of the same level" means that the difference between the coefficients is $1.5 \times 10^{-5}/°C$. or smaller, preferably $1.0 \times 10^{-5}/°C$. or smaller. The coefficient of thermal expansion of each member in this case is determined by measuring the length of the member with the same volume alone under controlled room temperature (25° C.) before thermal expansion and the length of the member after thermal expansion with changes in temperature, and substituting the values into the equation: coefficient of thermal expansion (/° C.)=[(length after thermal expansion−length before thermal expansion)/length before thermal expansion×change in temperature]. Here, heating for changes in temperature is conducted by, for example, leaving the member in a thermostat bath at 60° C. for 100 hours. In order to give the same coefficient of thermal expansion to the white film 8 and the support 4, these members are more preferably made of the same material and have the same thickness. In the case of using a stack of a film serving as the light-reflective member and a film serving as the light-shielding member, each film and the support 4 are preferably made of the same material, and more preferably, the stack of the films and the support 4 have the same thickness in addition to the above same material condition.

The adhesive layer 9 may be a usual product such as a transparent double-sided tape. Examples thereof include an optical material adhesive film (trade name: PANACLEAN®) available from Panac Co., Ltd., and an optical adhesive sheet available from Lintec Corporation. The adhesive layer 9 may have any thickness.

Figure 4:
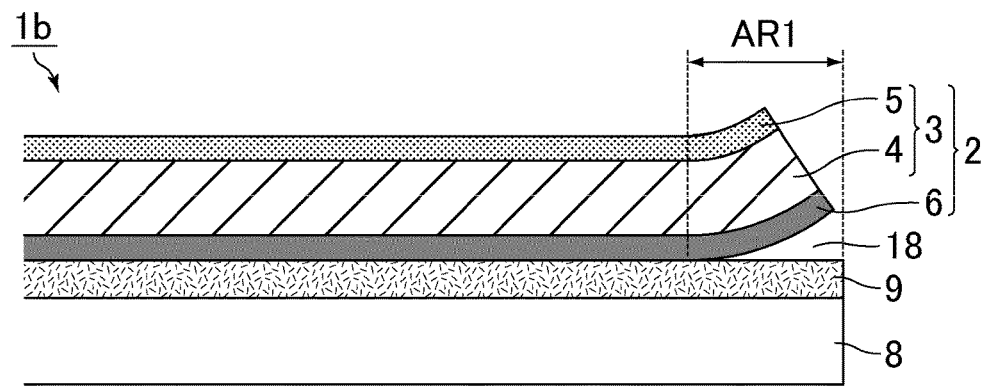
FIG. 4 is a schematic cross-sectional view illustrating the state where a transparent film has peeled off at an edge of the printed matter of Embodiment 2.
Figure 6:
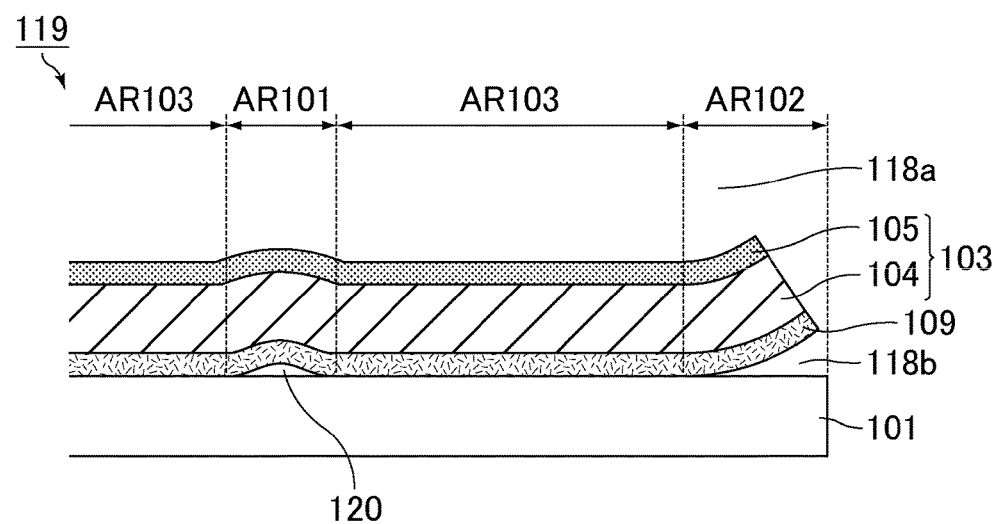
FIG. 6 is a schematic cross-sectional view illustrating a conventional laminated printed matter.

Since the configuration in Embodiment 2 includes an integrate of the ink-absorbing layer 6 and the anti-reflection film 3, the ink-absorbing layer 6 and the anti-reflection film 3 can be prevented from being separated from each other due to factors such as air bubbles and peeling. In the printed matter of Embodiment 2, as illustrated in FIG. 4, the transparent film 2 may be peeled from the white film 8 at an edge (outer edge). FIG. 4 is a schematic cross-sectional view illustrating the state where a transparent film has peeled off at an edge of the printed matter of Embodiment 2. As illustrated in FIG. 4, the transparent film 2 is peeled from the white film 8 in a region AR1 of the printed matter 1b, and an air layer 18 is a space formed as a result of peeling of the transparent film 2 from the white film 8. Even in the case the transparent film 2 is peeled from the white film 8 in the region AR1, since the ink-absorbing layer 6 on which data is to be printed is integrated with the anti-reflection film 3, the interfacial reflection (reflectance: about 4%) between the ink-absorbing layer 6 and the air layer 18 is less noticeable. This is also shown by the reflectance (about 4%) at the interface between the ink-absorbing layer 6 and the air layer 18 in the region AR1 which is smaller than the reflectance (about 8%) in each of the regions AR101 and AR102 in the conventional laminated printed matter as illustrated in FIG. 6. Accordingly, the configuration of Embodiment 2 enables a printed matter that is less likely to exhibit apparently white-tinged images and has less degraded image quality. The configuration of Embodiment 2 is also applicable to both a printed matter with a frame and a printed matter without a frame.

(2) Process of Producing Printed Matter

Figure 5:
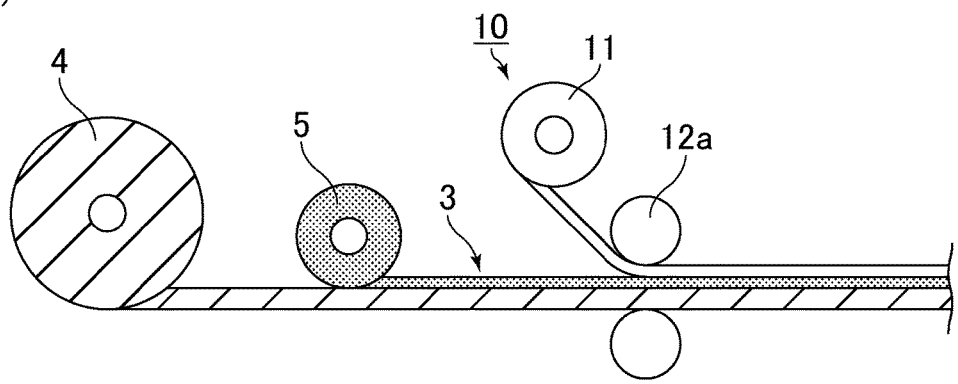
FIG. 5 includes schematic cross-sectional views illustrating the process of producing the printed matter of Embodiment 2 (steps a to f).
Figure 5:
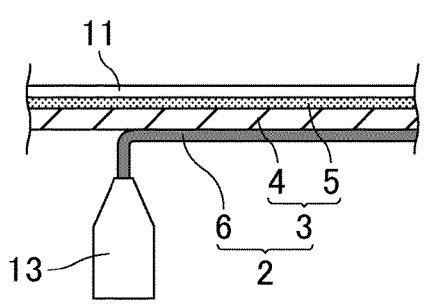
Figure 5:
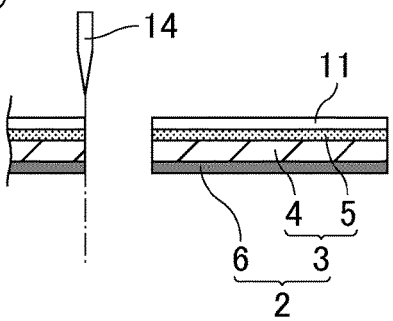
Figure 5:
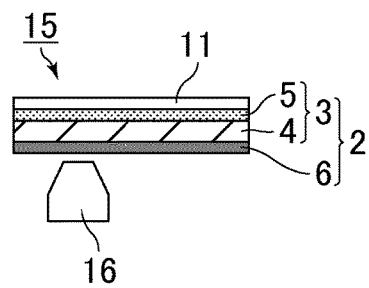
Figure 5:
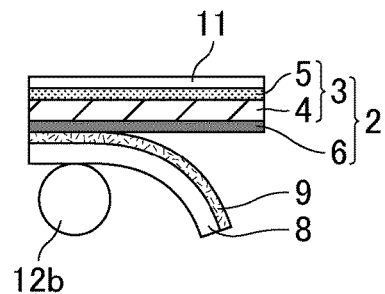
Figure 5:
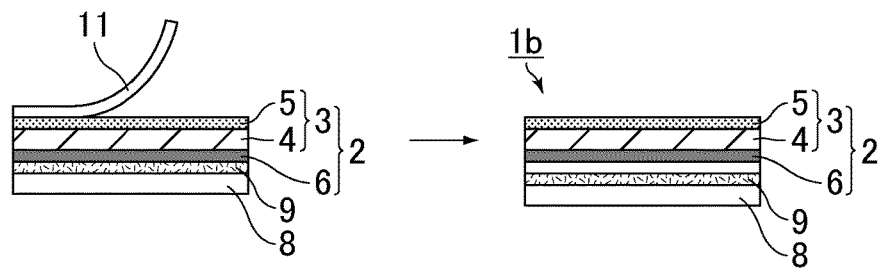

FIG. 5 includes schematic cross-sectional views illustrating the process of producing the printed matter of Embodiment 2 (steps a to f). The following describes the case where the anti-reflection layer 5 has a moth-eye structure, but the anti-reflection layer 5 may have any other configuration (e.g. resin film, inorganic film).

(a) Formation of Anti-Reflection Film

As illustrated in the view (a) of FIG. 5, first, the rolled-up support 4 (e.g. a 100-μm-thick PET film) is prepared. On the surface of the support 4 is stacked a transparent resin (anti-reflection layer 5) having a moth-eye structure using a roll-shaped mold, so that the anti-reflection film 3 is completed. The rolled-up protective film 11 with a slightly adhesive layer is prepared. The protective film 11 is press-attached to the anti-reflection layer 5 side surface of the anti-reflection film 3 using the roller 12a of the laminating device 10. The protective film 11 is disposed to protect the anti-reflection layer 5. The laminating device 10 may be a usual device, and may be a laminating device available from Fujipream Corp., for example. The method for attaching the protective film 11 to the anti-reflection film 3 described above is press-attaching rolled-up sheets to each other. Alternatively, an anti-reflection film 3 and a protective film 11 each having a predetermined shape may be attached to each other by, for example, a sheet-to-sheet attaching device available from Climb Products Co., Ltd.

(b) Formation of Transparent Film

As illustrated in the view (b) of FIG. 5, the ink-absorbing layer 6 (e.g. 10-μm-thick layer) is applied to the support 4 side surface of the anti-reflection film 3 using the slot coater 13, whereby the rolled-up transparent film 2 is formed.

(c) Cutting

As illustrated in the view (c) of FIG. 5, the transparent film 2 with the protective film 11 is cut into a predetermined size (e.g. A4 size) using the cutting unit 14. The cutting unit 14 may be a usual cutting system. For example, in the case of a die-cutting system, a Thomson die may be used.

(d) Printing

As illustrated in the view (d) of FIG. 5, an image is printed on the ink-absorbing layer 6 side of the transparent film 2 using the printing device 16 (e.g. Inkjet printer) included in the printing unit 15. Some shapes of images to be printed may require the images to be horizontally reversed before the images are printed on the ink-absorbing layer 6 side surface. In this case, image information with a reversed image may be input to the printing device 16 and the reversed image may be printed on the ink-absorbing layer 6 side surface of the transparent film 2. Alternatively, the image information input to the printing device 16 may be reversed, and the resulting reversed image may be printed on the ink-absorbing layer 6 side surface of the transparent film 2. Here, the printing unit 15 includes the transparent film 2 and the printing device 16.

(e) Formation of Light-Reflective Member (Film)

As illustrated in the view (e) of FIG. 5, after the printing surface of the ink-absorbing layer 6 is sufficiently dried, the white film 8 is press-attached to the entire surface of the ink-absorbing layer 6 on the side opposite to the support 4 with the adhesive layer 9 in between using a roller 12b. The adhesive layer 9 is formed on the white film 8 side in advance.

(f) Completion of Printed Matter

If the edges of the transparent film 2 and white film 8 are not aligned, the edges are appropriately cut to form an edge surface. Thereafter, as illustrated in the view (f) of FIG. 5, the protective film 11 is peeled from the transparent film 2, so that the printed matter 1b is completed.

The process of producing a printed matter described above is merely one example, and any other process capable of producing a printed matter having the same final structure as that of Embodiment 2 may be employed. For example, in the case that a photo-printing company prints data, a higher production efficiency may be achieved and the cost may be reduced by employing a process of forming the rolled-up transparent film 2 (step (b)), performing printing (step (d)), attaching the white film 8 (step (e)), and cutting the workpiece into a predetermined size (step (c)). The protective film 11 may be unnecessary in some cases. In the case that an individual prints data using a consumer color printer and the provided transparent film 2, the anti-reflection layer 5 may possibly be contaminated during process. Hence, the protective film 11 for protection of the anti-reflection layer 5 is preferably attached to the transparent film 2, and the protective film 11 may be peeled at a later timing such as after printing.

The following describes examples in which the printed matter of Embodiment 2 was actually produced.

Example 4

Example 4 is the case where the anti-reflection layer 5 has a moth-eye structure.

The anti-reflection film 3 used had the following configuration.
(A) Pitch between protrusions: 200 nm
(B) Height of protrusions: 200 nm
(C) Shape or protrusions: Substantially conical shape
(D) Support 4: 100-μm-thick PET film The ink-absorbing layer 6 had a thickness of 10 μm. The printing device 16 used was an inkjet color printer (e.g. trade name: EP-976A3) available from Seiko Epson Corporation. With the printer, data was printed on the ink-absorbing layer 6 side of the transparent film 2 that was cut into the A4 size. Here, image information with a reversed image was input to the printing device 16 and the reversed image was printed.

The white film 8 used was a white PET film available from Teijin DuPont Films Japan Limited, and had a thickness of 100 μm.

The adhesive layer 9 used was an optical adhesive sheet available from Lintec Corporation, and had a thickness of 15 μm.

Example 5

Example 5 is the case where the anti-reflection layer 5 is formed from a resin film. Since the printed matter of Example 5 is the same as that of Example 4 except for this configuration, the same points are not described here.

The anti-reflection film 3 used was an anti-reflection film (trade name: Fine Tiara) available from Panasonic Corporation.

Example 6

Example 6 is the case where the anti-reflection layer 5 is formed from an inorganic film. Since the printed matter of Example 6 is the same as that of Example 4 except for this configuration, the same points are not described here.

The anti-reflection film 3 used was an anti-reflection film available from Dexerials Corporation.

(Evaluation Results)

The reflectance was measured using each of the printed matters of Examples 4 to 6. Table 2 shows the measurement results. The reflectance was measured using a spectrophotometer (trade name: CM2002) available from Minolta Co., Ltd., with a black image printed entirely on the ink-absorbing layer 6 side surface of the transparent film 2. Also, the same configuration as that of Example 4 but without the anti-reflection layer 5 was evaluated (Comparative Example 2).

TABLE 2

| | Anti-reflection layer configuration | Reflectance (%) |
|---|---|---|
| Example 4 | Moth-eye structure | 0.10 |
| Example 5 | Resin film | 0.50 |
| Example 6 | Inorganic film | 0.26 |
| Comparative Example 2 | N/A | 4.0 |

As shown in Table 2, the printed matters of Examples 4 to 6 each demonstrated a lower reflectance than the printed matter of Comparative Example 2. In particular, the printed matter of Example 4 demonstrated a significantly lower reflectance than any other printed matters of the examples. Hence, the printed matter of Example 4 with such a low reflectivity can present a jet-black color. Also, a conventional printed matter (e.g. photograph) alone unfortunately reflects light components having a wavelength corresponding to a color other than red on the surface thereof in a region in which an image is printed with a red ink, which reduces the color purity. In contrast, the printed matter of Example 4 has a significantly small surface reflectance of every light component in the entire visible light region, and thus can display the true color of the ink without color purity reduction. Thus, the printed matter of Example 4 can exhibit even higher image quality than the printed matters of the other examples. The printed matter of Example 6 had a second best reflectance of 0.26% next to the printed matter of Example 4, but had a problem of tinted reflected light due to its wavelength-dependent reflectance. This problem causes visual recognition of a tint undesired by the creator particularly in a photograph used for an artwork, and thus has been strongly desired to be eliminated. The printed matter of Example 4 did not involve the problem of tinted reflected light. The printed matter of Example 5 did not produce much tinted reflected light, and had a third best reflectance of 0.50% next to the printed matters of Examples 4 and 6. Also, the printed matters of Example 4 to 6 did not exhibit visually recognizable apparently white-tinged images at all, and beautifully displayed the images.

[Additional Remarks]

Hereinafter, examples of preferred modes of the transparent film of the present invention are described. The modes may appropriately be combined within the spirit of the present invention.

The anti-reflection layer may have, on the surface thereof on the side opposite to the support, an anti-reflection structure with multiple protrusions disposed at a pitch not greater than the visible light wavelength. Thereby, even when the anti-reflection layer has a moth-eye structure, the present invention can be suitably used. Also, this mode can give a printed matter with even higher image quality.

The ink-absorbing layer may contain porous silica. This mode enables the ink used for printing of data on the ink-absorbing layer to be effectively fixed.

The examples of the preferred modes of the transparent film of the present invention are described above. These examples are also the examples of preferred modes of the transparent film on which data is printed by the printing device of the present invention, and preferred modes of the transparent film used in the printing unit of the present invention.

Hereinafter, examples of preferred modes of the printed matter of the present invention are described. The modes may appropriately be combined within the spirit of the present invention.

The printed matter may further include a light-reflective member on the surface of the ink-absorbing layer on the side opposite to the support. The light-reflective member can prevent the back side of the printed matter from being visible therethrough and can provide the image printed on the ink-absorbing layer vividly by utilizing its light reflectivity. Also, the light-reflective member may be disposed directly on the surface of the ink-absorbing layer on the side opposite to the support, or may be attached to the surface of the ink-absorbing layer on the side opposite to the support with a component such as an adhesive layer in between.

The light-reflective member may include a white-ink layer. Thereby, even when the light-reflective member is a white-ink layer, the present invention can be suitably utilized. Also, this mode can achieve a printed matter in which the transparent film and the light-reflective member (the white-ink layer) are integrated without separation.

The printed matter may further include a black-ink layer serving as a light-shielding member on the white-ink layer on the side opposite to the transparent film. Accordingly, in the case that the white-ink layer alone unfortunately allows the back side of the printed matter to be visible therethrough, further disposing the black-ink layer can further enhance the light-shielding performance.

The light-reflective member may include a white film. Thereby, even when the light-reflective member is a white film, the present invention can be suitably utilized.

The printed matter may further include a black film serving as a light-shielding member on the white film on the side opposite to the transparent film. Accordingly, in the case that the white film alone unfortunately allows the back side of the printed matter to be visible therethrough, further disposing the black film can further enhance the light-shielding performance.

The white film and the support may be made of the same material. This mode enables the white film and the support to have coefficients of thermal expansion of the same level, and therefore can prevent a warp of the printed matter with changes in temperature. In order to give the same coefficient of thermal expansion to the white film and the support, the white film and the support are more preferably made of the same material and have the same thickness. This mode can then perfectly prevent a warp of the printed matter with changes in temperature. In the case of using a stack of the white film serving as the light-reflective member and the black film serving as the light-shielding member, the white film, the black film, and the support are preferably made of the same material, and more preferably, the support and the stack of the white film and the black film have the same thickness in addition to the same material condition.

REFERENCE SIGNS LIST 1a, 1b, 101: printed matter
2: transparent film
3, 103: anti-reflection film
4, 104: support
105: anti-reflection layer
6: ink-absorbing layer
7: white-ink layer
8: white film
9, 109: adhesive layer
10: laminating device
11: protective film
12a, 12b: roller
13: slot coater
14: cutting unit
15: printing unit
16: printing device
17: screen printer
18, 118a, 118b: air layer
119: laminated printed matter
120: air bubble
AR1, AR101, AR102, AR103: region

The invention claimed is:

1. A printed matter comprising:
a transparent film; and
a light-reflective member,
the transparent film including
a support,
an anti-reflection layer disposed on one side of the support, and
an ink-absorbing layer disposed on another side of the support, the ink-absorbing layer having been subjected to printing,
the anti-reflection layer including, on a surface of the side opposite to the support, an anti-reflection structure including multiple protrusions, a pitch between ones of the multiple protrusions being not greater than a visible light wavelength,
the ink-absorbing layer being in direct contact with the support, and
the light-reflective member being disposed on a surface of the ink-absorbing layer, on a side opposite to the support.

2. The printed matter according to claim 1,
wherein the ink-absorbing layer contains porous silica.

3. The printed matter according to claim 1,
wherein the light-reflective member includes a white-ink layer.

4. The printed matter according to claim 3, further comprising
a black-ink layer, serving as a light-shielding member on the white-ink layer, on a side opposite to the transparent film.

5. The printed matter according to claim 1,
wherein the light-reflective member includes a white film.

6. The printed matter according to claim 5, further comprising
a black film, serving as a light-shielding member on the white film, on a side opposite to the transparent film.

7. The printed matter according to claim 5,
wherein the white film and the support are made of a same material.

8. A printing device configured to perform printing on the transparent film of the printed matter according to claim 1,
the printing device configured to produce a reversed image of input image information, and configured to print the reversed image on the ink-absorbing layer side of the transparent film.

9. A printing unit, comprising:
the transparent film of the printed matter according to claim 1, and
a printing device configured to perform printing on the transparent film,
the printing device configured to produce a reversed image of input image information, and configured to print the reversed image on the ink-absorbing layer side of the transparent film.

10. The printed matter according to claim 1,
wherein the pitch between ones of the multiple protrusions is not smaller than 100 nm and not greater than 700 nm.

11. The printed matter according to claim 1,
wherein a height of each of the multiple protrusions is not lower than 100 nm and not higher than 400 nm.

12. The printed matter according to claim 1,
wherein a shape of each of the multiple protrusions is a substantially conical shape.

13. A printing device configured to perform printing on the transparent film of the printed matter according to claim 10,
the printing device configured to produce a reversed image of input image information, and configured to print the reversed image on the ink-absorbing layer side of the transparent film.

14. A printing unit, comprising:
the transparent film of the printed matter according to claim 10, and
a printing device configured to perform printing on the transparent film,
the printing device configured to produce a reversed image of input image information, and configured to print the reversed image on the ink-absorbing layer side of the transparent film.

15. A printing device configured to perform printing on the transparent film of the printed matter according to claim 11,
the printing device configured to produce a reversed image of input image information, and configured to print the reversed image on the ink-absorbing layer side of the transparent film.

16. A printing unit, comprising:
the transparent film of the printed matter according to claim 11, and
a printing device configured to perform printing on the transparent film,
the printing device configured to produce a reversed image of input image information, and configured to print the reversed image on the ink-absorbing layer side of the transparent film.

17. A printing device configured to perform printing on the transparent film of the printed matter according to claim 12,
the printing device configured to produce a reversed image of input image information, and configured to print the reversed image on the ink-absorbing layer side of the transparent film.

18. A printing unit, comprising:
the transparent film of the printed matter according to claim 12, and
a printing device configured to perform printing on the transparent film,
the printing device configured to produce a reversed image of input image information, and configured to print the reversed image on the ink-absorbing layer side of the transparent film.

19. The printed matter according to claim 1,
wherein the anti-reflection layer is in direct contact with the support.

* * * * *